(12) United States Patent
Hartmann

(10) Patent No.: US 8,776,384 B2
(45) Date of Patent: Jul. 15, 2014

(54) LINE OF SIGHT DEPTH OF CUT SCALE

(75) Inventor: James Richard Hartmann, Park Ridge, IL (US)

(73) Assignee: Robert Bosch GmbH, Stuttgart (DE)

( * ) Notice: Subject to any disclaimer, the term of this patent is extended or adjusted under 35 U.S.C. 154(b) by 1082 days.

(21) Appl. No.: 12/711,429

(22) Filed: Feb. 24, 2010

(65) Prior Publication Data

US 2011/0203121 A1    Aug. 25, 2011

(51) Int. Cl.
*B27B 9/04* (2006.01)

(52) U.S. Cl.
USPC .................... 30/374; 30/375; 30/377; 30/388

(58) Field of Classification Search
USPC ................. 30/374, 375, 377, 388, 390, 391; 33/632, 633, 640; 116/278; 83/522.15, 83/522.18, 522.19
See application file for complete search history.

(56) References Cited

U.S. PATENT DOCUMENTS

| | | | | |
|---|---|---|---|---|
| 1,861,943 A * | 6/1932 | Theis | ............................. | 116/332 |
| 2,539,458 A * | 1/1951 | Myers | ........................... | 116/243 |
| 2,827,872 A * | 3/1958 | Thoma | .......................... | 116/309 |
| 2,860,215 A * | 11/1958 | Williams | ....................... | 338/79 |
| 2,940,349 A * | 6/1960 | York et al. | ...................... | 83/207 |
| 3,117,312 A * | 1/1964 | Watson | ......................... | 340/316 |
| 3,139,854 A * | 7/1964 | Hedges et al. | ................. | 116/278 |
| 3,182,631 A * | 5/1965 | Gomes | .......................... | 116/278 |
| 3,262,471 A * | 7/1966 | McCarty | ........................ | 30/377 |
| 3,262,472 A * | 7/1966 | McCarty et al. | ................ | 30/376 |
| 3,262,473 A * | 7/1966 | Elson | ............................. | 30/377 |
| 3,266,457 A * | 8/1966 | Morgan | ........................ | 116/278 |
| 3,292,673 A * | 12/1966 | Gregory | ......................... | 30/377 |
| 3,733,701 A * | 5/1973 | Lubas | ............................. | 30/391 |
| 4,856,394 A * | 8/1989 | Clowers | ........................... | 83/56 |
| 4,982,501 A * | 1/1991 | Sauerwein et al. | ............. | 30/376 |
| 5,010,651 A * | 4/1991 | Techter et al. | .................. | 303/76 |
| 5,173,588 A * | 12/1992 | Harrah | .......................... | 235/114 |
| 5,495,784 A * | 3/1996 | Chen | ............................. | 83/471.2 |
| 5,570,511 A * | 11/1996 | Reich et al. | ..................... | 30/376 |
| 5,758,425 A | 6/1998 | Gallagher et al. | | |
| 6,308,755 B1 * | 10/2001 | Chiang | ........................ | 144/130 |
| 6,886,259 B2 * | 5/2005 | Kani | ............................... | 30/376 |
| 6,951,057 B2 | 10/2005 | Yoshida et al. | | |
| 7,013,574 B2 * | 3/2006 | Plunkett | ......................... | 33/640 |
| 7,290,342 B2 * | 11/2007 | Hartmann et al. | ............. | 30/388 |
| 7,526,980 B2 * | 5/2009 | Bocka et al. | ..................... | 74/525 |
| 7,614,330 B2 * | 11/2009 | Griswold et al. | ............ | 83/477.2 |
| 8,056,243 B2 * | 11/2011 | Sargeant et al. | ................ | 30/377 |
| 2001/0005940 A1 * | 7/2001 | Schwarz | ......................... | 30/123 |
| 2002/0023360 A1 * | 2/2002 | Zeiler et al. | ..................... | 30/376 |
| 2003/0000091 A1 * | 1/2003 | Havenstein et al. | ........... | 30/371 |
| 2005/0000338 A1 | 1/2005 | Wascow | | |
| 2009/0126206 A1 * | 5/2009 | Chung et al. | .................... | 30/376 |
| 2009/0165624 A1 * | 7/2009 | Brown et al. | ................... | 83/477 |

* cited by examiner

*Primary Examiner* — Jason Daniel Prone
(74) *Attorney, Agent, or Firm* — Maginot, Moore & Beck

(57) ABSTRACT

A depth of cut scale is provided for a circular saw having a foot, a pivoting assembly (including a rotary saw blade) pivotably mounted to the foot, and a depth of cut adjustment mechanism operable to lock the pivoting assembly at a depth of cut (DOC) orientation relative to the foot. The depth of cut scale includes a shelf associated with and pivotable with the pivoting assembly. The shelf includes an upper surface bearing indicia indicative of DOC. An elongated element is fixed at one end relative to the pivoting assembly and includes a pointer adjacent an opposite end arranged to point to the indicia on the upper surface. The pointer is fixed in relation to the shelf as the shelf pivots with the pivoting assembly. The elongated element may be a flexible element that is maintained in tension overlaying the upper surface, or a cantilevered arm.

16 Claims, 4 Drawing Sheets

LINE OF SIGHT DEPTH OF CUT SCALE

BACKGROUND

The present disclosure relates to portable circular saws, and particularly to a display for indicating a saw's cutting depth.

Circular saws are typically provided with the capability of adjusting the depth of cut (DOC) relative to the workpiece. In using a circular saw, it is desirable from a cutting performance standpoint that the cutting blade extends a predetermined distance below the surface of the workpiece being cut. That predetermined distance is typically one tooth depth to avoid splintering as the cut is made.

In a typical circular saw 10, depicted in FIG. 1, a pivoting assembly 11 includes a motor housing 12 with a hand grip for guiding the saw during a cut. The motor housing and hand grip are mounted to an upper guard 16 that shrouds the upper portion of the cutting blade 18. The upper guard of the pivoting assembly 11 is pivotably mounted to a foot 20 at a pivot mount 17 (FIG. 2). The foot 20 is planar and adapted for sliding along the workpiece during a cut. The foot 20 defines a slot 22 (FIG. 1) through which the cutting blade extends.

The upper guard 16 is pivotably mounted to the foot 20 to allow the entire assembly of the motor, guard and cutting blade to pivot in the direction P (FIG. 2) relative to or away from the foot 20. In an initial position, as depicted in FIGS. 1-2, the cutting blade extends at its maximum DOC As the pivoting assembly 11 is pivoted upward in the direction P, the DOC is decreased.

The circular saw 10 incorporates a mechanism for permitting adjustment of the DOC and fixing the cutting blade at the particular pivot angle corresponding to that DOC. Thus, in certain saws, a DOC bracket 24 (FIG. 1) projects perpendicularly upward from the back edge of the foot 20 and generally parallel with the upper guard 16. An adjustment rod 26 extends from the upper guard 16 (and/or the hand grip 14) and through a slot 25 in the bracket 24. An adjustment lever 28 may be provided to manually loosen or tighten the rod relative to the bracket 24 in a known manner. When the lever 28 is released or manipulated to release the clamping force between the rod 26 and the DOC bracket 24, the pivoting assembly 11 can be pivoted in the direction P, after which the lever 28 can be returned to its locking position to fix the pivoting assembly at a desired orientation.

In order to determine the actual DOC of the cutting blade, a scale 30 is provided on the upper guard 16. A tab 32 projecting from the depth adjustment bracket 24 points to a particular depth value on the scale. As can be seen from FIGS. 1-2, the scale 30 and tab 32 are best viewed from one end of the saw 10. Moreover, due to the orientation of the scale the user must typically bend down to achieve a more horizontal line of sight in order to accurately read the DOC value. At a minimum, requiring the user to bend down in order to read the DOC value is uncomfortable to the user. In the worst case, the user cannot bend to the optimal line of sight and thus misreads the DOC value. There is therefore a need for a DOC scale that can be accurately read without requiring any physical gyrations by the user.

SUMMARY

In accordance with one feature, a depth of cut scale is carried by the upper guard of a circular saw in a location that can be viewed from above the saw. A circular saw includes a foot, a pivoting assembly (including the rotary saw blade) pivotably mounted to the foot, and a depth of cut (DOC) adjustment mechanism operable to lock the assembly at a particular pivot angle relative to the foot. The line of sight depth of cut scale includes a shelf associated with and pivotable with the assembly, the shelf including an upper surface bearing indicia indicative of DOC. The scale further includes an elongated element fixed at one end relative to the pivoting assembly and arranged to overlay the upper surface. The elongated element includes a pointer arranged to point to the indicia. The pointer has a fixed spatial relationship relative to the shelf as the shelf pivots with the pivoting assembly, so that the pointer and shelf in effect move relative to each other.

In one embodiment, the elongated element is an elongated flexible element that is connected to the pivoting assembly at an end opposite the fixed end. In a further feature, the depth of cut scale includes a tension mechanism mounted to the pivoting assembly and connected to the opposite end of the flexible element. The tension mechanism is operable to maintain the flexible element in tension as the pivoting assembly pivots relative to the foot. The tension mechanism may include a spring, and in particular a coil or torsion spring, contained within a housing mounted to the assembly.

In another aspect, the flexible element is a flexible strip. The flexible strip has a width less than the width of the shelf upper surface and is arranged relative to the upper surface to not overlap the indicia. In an alternative embodiment, the flexible strip is configured so that the indicia are visible through the strip when said strip overlays the upper surface. Where the DOC adjustment mechanism includes a depth adjustment bracket mounted to the foot, one end of the flexible element is connected to the bracket.

In another embodiment, the elongated element is an arm that is cantilevered at the one end fixed relative to the pivoting assembly. The arm may incorporate a collar that is pivotably mounted to the depth adjustment bracket by a nut and bolt, or other suitable means (such as a shoulder rivet or screw). In a further feature, the pivot mount for the arm may include a biasing element operable to generate a torque to bias the arm toward the upper surface of the shelf. The arm includes the pointer adjacent the opposite end, which may be a visual symbol, such as an arrow, or may include a notch through which a DOC indicia is visible. The arm may be arranged to overlie at least a portion of the upper surface of the shelf.

In another aspect, the arm is situated beneath the shelf and the notch is configured to receive an edge of the shelf therein. An upper branch of the notch forms the pointer and travels along the upper surface of the shelf as the shelf pivots with the pivoting assembly.

DETAILED DESCRIPTION

Figure 1:
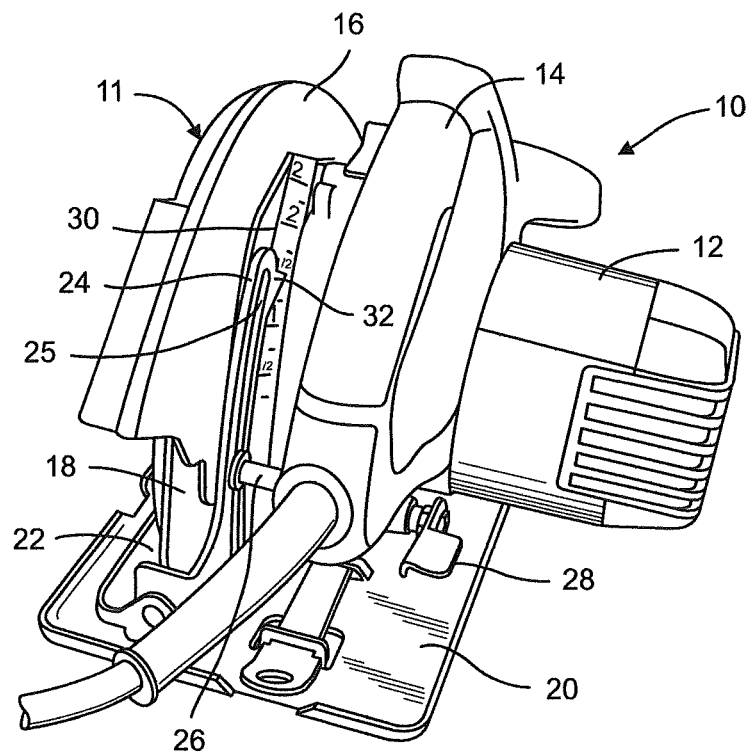
FIG. 1 is a top perspective view of one type of circular saw.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
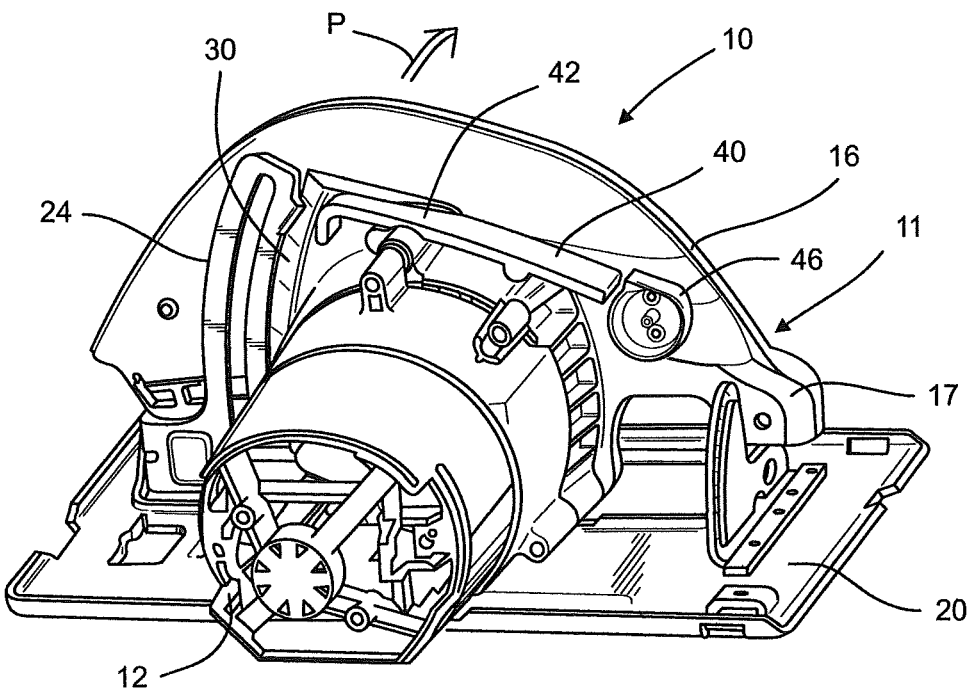
FIG. 2 is a side perspective view of a circular saw of the type shown in FIG. 1, modified in accordance with the present disclosure, viewed with certain components of the saw removed for clarity.
Figure 3:
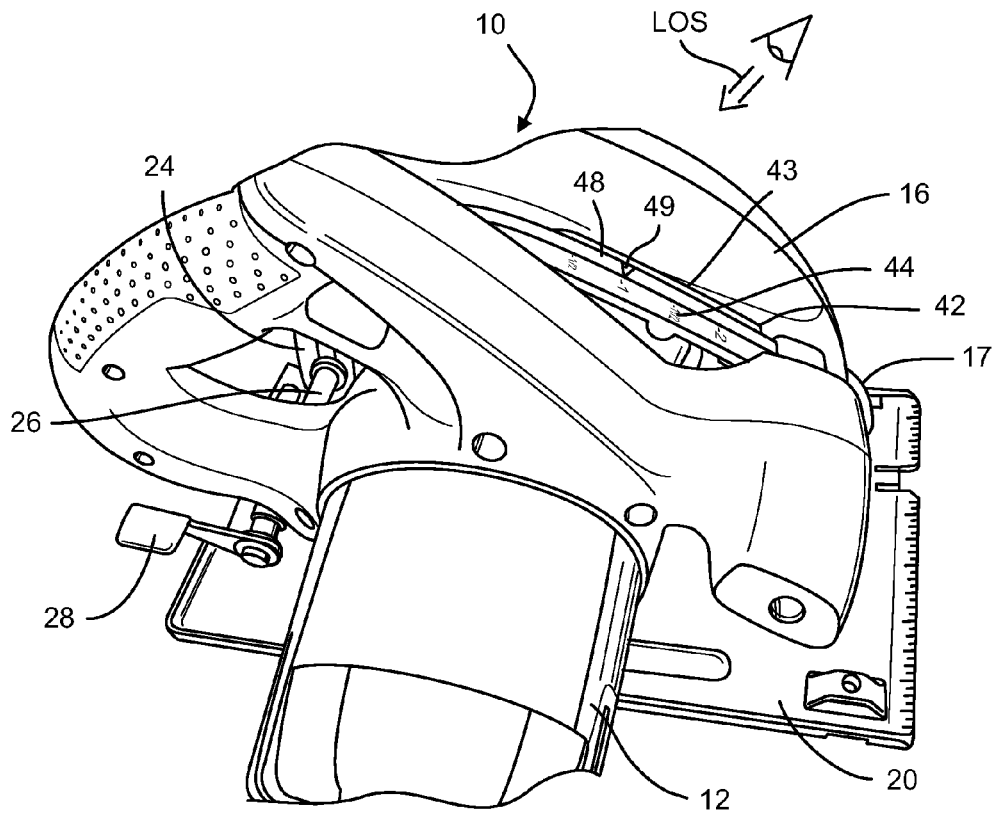
FIG. 3 is a top perspective view of a circular saw with modified in accordance with the present disclosure.
Figure 4:
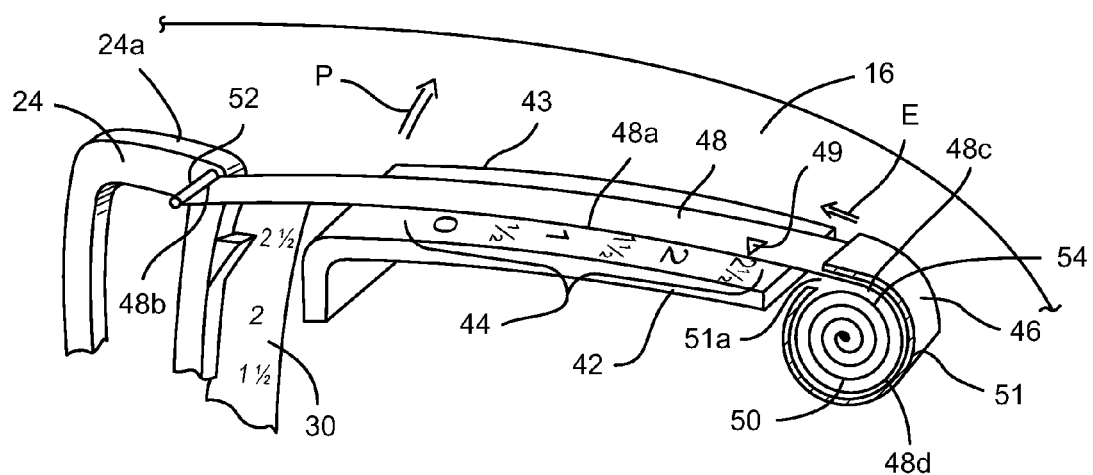
FIG. 4 is an enlarged side perspective view of the depth of cut scale feature of the present disclosure.

The present disclosure pertains to a depth of cut (DOC) scale that is more easily viewed by the user, particularly when the user is standing upright over the saw while adjusting the DOC according to conventional practice. Referring first to FIGS. 2-4, a circular saw of the type shown in FIG. 1 incorporates a depth of cut (DOC) scale 40 that includes a shelf 42 that is affixed to the upper guard 16 between the guard and the motor housing 12. As best seen in FIG. 4, the shelf is slightly curved and is generally aligned with the upper end 24a of the DOC bracket 24 when the saw blade is at its initial or deepest cut position—i.e., when the adjustment rod 26 is at the base of the DOC slot 25. The shelf 42 includes indicia 44 on its upper surface 43, the indicia related to the depth of cut of the saw. The indicia 44 may be a typical DOC scale that emulates the scale 30. However, unlike the scale 30, the indicia 44 on the shelf are visible on a line of sight LOS that is directly above the saw, as depicted in FIG. 3. Thus, the operator can readily view the scale indicia 44 of the DOC scale 40 with the saw 10 resting on the work surface or workpiece, according to the usual practice for adjusting DOC.

The DOC scale 40 of the present disclosure includes a pointer that is essentially fixed relative to the upper guard 16 and shelf 42 as the guard is pivoted to adjust the depth of cut. The DOC scale includes a flexible element 48 that carries a pointer 49 that is readily visible along the line of sight LOS above the tool. In one embodiment the flexible element is a flexible strip that spans part of the width of the shelf 42 immediately adjacent the indicia 44. The strip is thus configured to not overlap the indicia or otherwise impede a clear view of the DOC values. The pointer 49 is a visual indicator, such as a line or an arrow, or any indicator suitable to point toward the edge 48a of the flexible element and ultimately to point toward the indicia. Alternatively, the strip may cover the indicia with a transparent or open segment directly over the indicia through which the indicia may be viewed. In this alternative, the pointer may be in the form of a line or wire spanning the width of the transparent or open segment. In a further alternative, the flexible element may be a flexible wire with a pointer affixed thereto.

The flexible element 48 is affixed at one end 48b to the DOC bracket 24 mounted to the foot 20. The element 48 may thus be attached or affixed to an attachment member 52. The attachment member 52 may be a post projecting from the upper end 24a of the bracket 24 and may be configured for releasable attachment of the end 48b of the flexible element. For example, when the flexible element is a flexible strip, the attachment member 52 may include a post having a slot along its length through which the strip extends. The end 48b of the strip may include a dowel affixed thereto that prevents withdrawal of the strip from the slot in the post. Regardless of the manner in which the strip is connected to the DOC bracket it is necessary that the end 48b be anchored to the DOC bracket and fixed relative to the rotatable upper guard 16.

The opposite end 48c of the flexible element 48 is connected to a tension mechanism 46. The mechanism 46 is configured to maintain the flexible element 48 in tension across the surface 43 of the shelf 42 as the shelf pivots with the upper guard 16 during adjustment of the depth of cut. The slight curvature of the shelf 42 and the location of the shelf slightly above the attachment 52 and the tension mechanism 46 help maintain this tension. In one embodiment, the tension mechanism 46 includes a coil or torsion spring 50 with end 48c connected at an attachment point 54 to the spring. The manner of attachment of the end 48c may be similar to the manner of attachment of the end 48b. The spring 50 is contained within a housing 51 that may be mounted to the upper guard 16. The housing 51 defines an opening 51a through which the flexible element 48 extends, as shown in FIG. 4. The housing may be mounted immediately adjacent the shelf 42, and may even be mounted to or integral with one end of the shelf, to minimize the length of the flexible element that is not supported by the shelf.

At the maximum depth of cut position, an end portion 48d of the flexible element 48 is retracted within the housing 51 under force from the spring 50. As the upper guard 16 is pivoted in the direction P (FIG. 4) to decrease the DOC, more and more of the end portion 48d is paid out from the housing 51 in the direction E because the tension mechanism 46 moves away from the fixed end 48b of the flexible element. In essence, the scale 44 on the shelf 42 moves relative to the flexible element 48 and pointer 49. As the end portion 48d is paid out from the housing 51, the spring 50 winds more tightly to maintain continuous tension on the flexible element 48 and keep it tightly pressed against the surface 43 of the shelf as the shelf moves.

As shown in FIG. 4, the tension mechanism 46 includes a wound spring. Other mechanisms are contemplated that are capable of maintaining the flexible element 48 in tension sufficient to keep the flexible element pressed against the shelf during pivoting to adjust DOC. For instance, the spring may be a plate spring or a helical spring mounted in an appropriate relationship with the shelf. As a further alternative, the end portion 48d of the flexible element 48 may be elastic or stretchable, with the end 48c mounted to the upper guard 16.

In one aspect, the line of sight DOC scale 40 may be a self-contained unit. In this embodiment, the tension mechanism 46 is connected to or integral with the shelf 42. Mounting the housing 51 of the tension mechanism to the pivotably mounted assembly 11 (i.e., upper guard 16 or motor housing 12) also supports the shelf 42. The flexible element 48 is connected at the end 48c to the tension mechanism, while the other end 48b is initially free or perhaps retracted within the housing 51. When the scale 40 is mounted to the assembly, the flexible element can be extended across the upper surface 43 and the end 48b engaged to the depth adjustment bracket 24 at the attachment 52.

Figure 5:
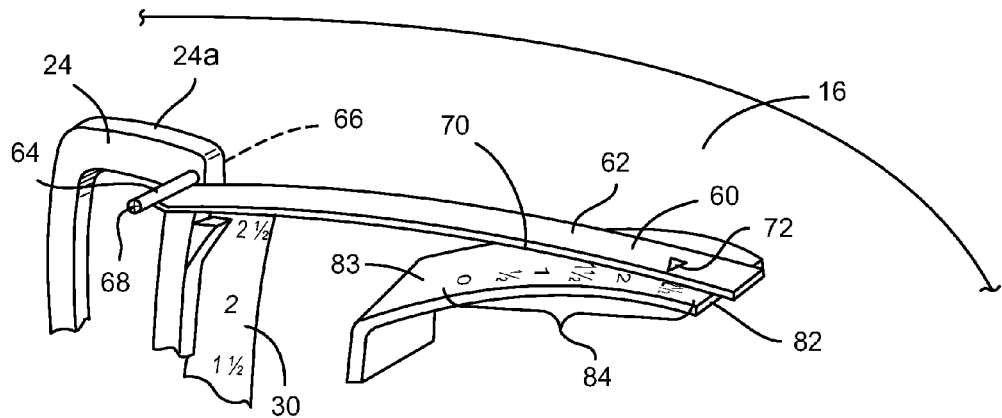
FIG. 5 is an enlarged side perspective view of a depth of cut scale feature according to another disclosed embodiment.
Figure 6:
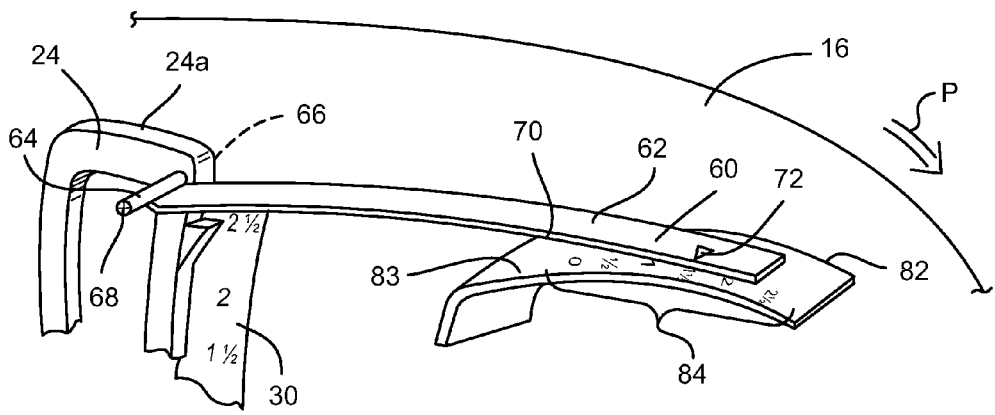
FIG. 6 is an enlarged side perspective view of the depth of cut scale shown in FIG. 5 with the upper guard pivoted to a different DOC setting.
Figure 7:
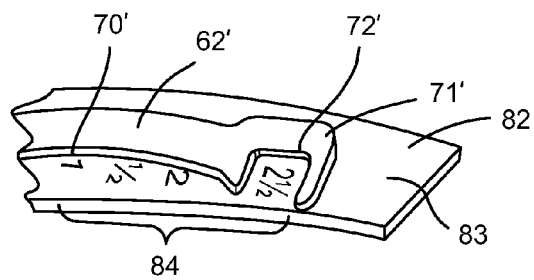
FIG. 7 is an enlarged partial view of an alternative indicator arm usable with the depth of cut feature shown in FIGS. 5-6.

Referring now to FIGS. 5-7, another DOC scale 60 is illustrated that incorporates a curved arm 62 that is fixed relative to the pivoting assembly 11 that includes the saw 10, motor housing 12 and upper guard 16. In particular, the arm 62 may be connected to the depth adjustment bracket 24 that is fixed to the foot 20 on which the assembly is pivotably mounted, like the DOC scale 40 described above. The curved arm 62 may thus terminate in a hub or collar 64 that is attached to the bracket by a bolt 66 and nut 68, or other suitable means. The collar and bolt arrangement serves as a pivot mount that allows the curved arm 62 to pivot relative to the upper end 24a of the bracket. The arm may be removably mounted to the bracket by way of the bolt and nut or other suitable means.

Like the DOC scale 40, the scale 60 shown in FIG. 5 includes a shelf 82 that is connected to the pivoting assembly, such as to the upper guard 16. The shelf includes DOC indicia 84 along the upper surface 83. The curved arm 62 sits on the upper surface of the shelf 82 and rides along that surface as the shelf pivots with the guard 16 in the direction P, as depicted in FIG. 6. The curved arm 62 may freely pivot at the collar 64 so that the force of gravity maintains the arm in contact with the shelf. Alternatively, a biasing element, such as a coil or torsion spring, may be incorporated into the collar 64 to generate a downward torque on the arm 62. This torque produces a downward force at the free end of the arm to hold the arm firmly in contact with the shelf.

The curved arm 62 may be configured so that the side edge 70 is offset relative to the indicia 84 on the shelf so that the indicia are plainly visible adjacent the arm. The arm further includes a pointer 72 at the edge 70 to point to a DOC value. In an alternative embodiment, a curved arm 62' shown in FIG. 7 may be configured to cover all or part of the indicia so that the side edge 70' overlaps the indicia 84 on the shelf. The free end 71' of the arm defines a notch 72' that is large enough for a DOC value to be fully visible within the notch. It can be appreciated that this version of the arm 62' and pointer notch 72' is best used with saws having discrete DOC adjustments, rather than saws capable of infinite DOC adjustment. In the latter case, the use of a pointer 72 of the arm 62 shown in FIG. 5 may be desirable.

The shelf 82 in this embodiment may have a greater curvature than the shelf 42 because the curved arm 62 is generally rigid. In order for the arm to ride generally flush with the upper surface 83 the shelf may be curved at a pivot radius relative to the pivot point 17 (FIG. 2) of the pivoting assembly 11. Alternatively, the arm 62 may exhibit some transverse flexibility to bend or flex when held in contact with the upper surface 83, especially under torque from the biasing element described above.

Figure 8:
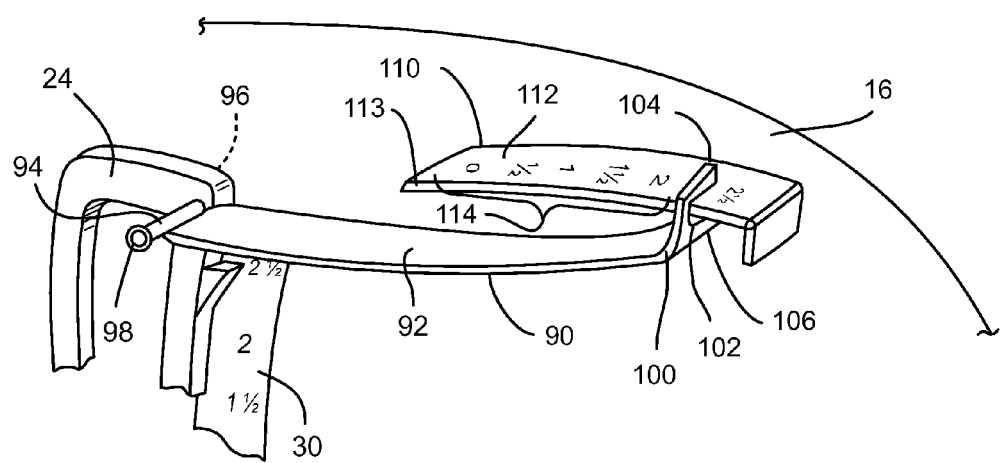
FIG. 8 is an enlarged side perspective view of a depth of cut scale according to yet another disclosed embodiment.

A depth of cut scale 90 shown in FIG. 8 incorporates the cantilevered arm of the scale in FIGS. 5-7, but rather than overlying the indicia the cantilevered arm 92 is situated beneath the shelf 110. In this embodiment, the arm 92 may include a pivot mount 94 with a bolt and nut connection 96, 98 (or other suitable means) similar to the arm 60 described above. However, the cantilevered end 100 of the arm is upturned and defines a generally U-shaped notch 102. The upper branch 104 of the U-shape overlies the shelf 110 while the lower branch 106 of the U-shape is situated beneath the shelf. The edge 113 of the shelf is thus situated within the notch 102 so that the cantilevered end 100 of the arm 92 is supported and guided by the shelf 110. The upper branch 104 may be configured as a pointer to point to a particular DOC indicia 114 as the upper guard 16 is pivoted.

The arm 92 is pivotably mounted to the foot, such as by way of the adjustment bracket. This allows the arm to move freely as the shelf is pivoted with the pivoting assembly to adjust the DOC, and prevents the shelf edge 113 from binding within the notch 102. In the embodiment shown in FIG. 8, the arm 92 is situated beneath the shelf so that the entire upper surface 112 of the shelf is visible, and the free end 100 is angled upward. The arm may be slightly curved toward the shelf to ensure clearance between the shelf and arm as the shelf pivots with the pivoting assembly 11.

Alternatively, the arm may be situated above the shelf but with the shelf edge 113 still situated within the notch 102. In this configuration, the arm 92 would obscure or hide some of the indicia while the upper branch 104 is positioned immediately proximate the indicia corresponding to the current DOC.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For example, in the depth of cut scale disclosed herein, the shelf 42, 82 with the DOC indicia is fixed to the pivoting assembly 11, while the elongated element is anchored to the DOC bracket 24. Alternatively, the shelf could be fixed to the DOC bracket. With this modification, the connections for the flexible strip 48 would be reversed. In other words, the biasing spring and housing 46, 50 would be mounted to the DOC bracket, while the "fixed" end 48b of the strip would be fastened to the pivoting assembly. Likewise, the cantilevered arm 60 would be "anchored" to and pivot with the pivoting assembly 11, while the free end and indicia 72 moves over the shelf.

What is claimed is:

1. A circular saw comprising:
   a foot;
   a pivoting assembly pivotably mounted to said foot, said pivoting assembly including a rotary saw blade;
   a depth of cut (DOC) adjustment mechanism operable to lock said pivoting assembly at a particular DOC orientation relative to said foot;
   a depth of cut scale including;
      a shelf associated with and pivotable with said pivoting assembly, said shelf including an upper surface bearing indicia indicative of DOC;
      an elongated element fixed at one end relative to said pivoting assembly and having a pointer adjacent an opposite end arranged to point to said indicia on said upper surface, said pointer and said shelf movable relative to each other as said shelf pivots with said pivoting assembly, wherein said elongated element is arranged to at least partially overlay said upper surface and said opposite end of said elongated element is connected to and movable with said pivoting assembly.

2. The circular saw of claim 1, wherein:
   said DOC mechanism includes a depth adjustment bracket mounted to said foot; and
   said one end of said elongated element is connected to said depth adjustment bracket.

3. The circular saw of claim 1, wherein said upper surface is curved.

4. The circular saw of claim 1, wherein said elongated element is pivotably mounted at said one end relative to said foot.

5. The circular saw of claim 4, wherein said depth of cut scale includes a biasing element associated with said one end operable to apply a torque to said elongated arm to bias said arm toward said shelf.

6. The circular saw of claim 5, wherein said pointer includes a notch defined in said arm adjacent said opposite end.

7. The circular saw of claim 6, wherein said notch is oriented and sized to view said indicia therethrough.

8. The circular saw of claim 6, wherein said notch is configured to receive an edge of said shelf, said notch having an upper branch defining said pointer.

9. A circular saw comprising:

a foot;

a pivoting assembly pivotably mounted to said foot, said pivoting assembly including a rotary saw blade;

a depth of cut (DOC) adjustment mechanism operable to lock said pivoting assembly at a particular DOC orientation relative to said foot;

a depth of cut scale including;

a shelf associated with and pivotable with said pivoting assembly, said shelf including an upper surface bearing indicia indicative of DOC;

an elongated flexible element fixed at one end relative to said pivoting assembly and having a pointer adjacent an opposite end arranged to point to said indicia on said upper surface, said pointer and said shelf movable relative to each other as said shelf pivots with said pivoting assembly, wherein said flexible element is arranged to at least partially overlay said upper surface, said opposite end of said flexible element connected to and movable with said pivoting assembly; and a tension mechanism mounted to said pivoting assembly and connected to said opposite end of said flexible element, said tension mechanism operable to maintain said flexible element in tension as said pivoting assembly pivots relative to said foot.

10. The circular saw of claim 9, wherein:

said upper surface of said shelf has a width and said indicia are arranged along one side of said width; and said flexible element is a flexible strip having a width less than said width of said upper surface and arranged relative to said upper surface to not overlap said indicia.

11. The circular saw of claim 9, wherein:

said upper surface of said shelf has a width and said indicia are arranged along one side of said width; and said flexible element is a flexible strip configured so that said indicia are visible through said strip when said strip overlays said upper surface.

12. A depth of cut scale for use with a circular saw having a foot, a pivoting assembly, including a rotary saw blade, pivotably mounted to the foot, and a depth of cut adjustment mechanism connected to the foot for fixing the pivoting assembly when pivoted to a particular depth of cut (DOC) relative to the foot, said scale comprising:

a shelf connectable to and pivotable with the pivoting assembly, said shelf including an upper surface bearing indicia indicative of depth of cut;

an elongated element fixable at one end relative to the pivoting assembly and arranged to overlay said upper surface, said elongated element having a pointer arranged to point to said indicia, said pointer having a fixed relationship to said shelf when said shelf pivots with the pivoting assembly, wherein said elongated element is an elongated flexible strip connectable at an opposite end to the pivoting assembly; and a tension mechanism mountable to the pivoting assembly and connected to said opposite end of said flexible strip, said tension mechanism operable to maintain said flexible strip in tension as the tension mechanism and shelf pivot with the pivoting assembly relative to the foot.

13. The depth of cut scale of claim 12, wherein said tension mechanism includes a coil spring contained within a housing.

14. A depth of cut scale for use with a circular saw having a foot, a pivoting assembly, including a rotary saw blade, pivotably mounted to the foot, and a depth of cut adjustment mechanism connected to the foot for fixing the pivoting assembly when pivoted to a particular depth of cut (DOC) relative to the foot, said scale comprising:

a shelf connectable to and pivotable with the pivoting assembly, said shelf including an upper surface bearing indicia indicative of depth of cut; and an elongated element fixable at one end relative to the pivoting assembly and arranged to overlay said upper surface, said elongated element having a pointer arranged to point to said indicia, said pointer having a fixed relationship to said shelf when said shelf pivots with the pivoting assembly, wherein said elongated element is an elongated arm that is pivotably mounted at said one end to said pivoting assembly.

15. The depth of cut scale of claim 14, wherein said pointer includes a notch defined in said arm adjacent said opposite end, said notch arranged and sized to view said indicia therethrough.

16. The depth of cut scale of claim 14, wherein said pointer includes a notch defined in said arm adjacent said opposite end, said notch configured to receive an edge of said shelf, said notch having an upper branch defining said pointer.

* * * * *